United States Patent
Sun et al.

(10) Patent No.: US 9,971,751 B1
(45) Date of Patent: *May 15, 2018

(54) VERSION-SPECIFIC REQUEST PROCESSING

(71) Applicant: Amazon Technologies, Inc., Seattle, WA (US)

(72) Inventors: Vanessa Y. Sun, Seattle, WA (US); Feras Karablieh, Issaquah, WA (US); Xiaohu Liu, Bellevue, WA (US); Ajay M. Desai, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 498 days.

This patent is subject to a terminal disclaimer.

(21) Appl. No.: 14/610,716

(22) Filed: Jan. 30, 2015

Related U.S. Application Data (63) Continuation of application No. 12/164,761, filed on Jun. 30, 2008, now Pat. No. 8,949,713.

(51) Int. Cl.
*G06F 17/00* (2006.01)
*G06F 17/22* (2006.01)
*G06F 17/24* (2006.01)

(52) U.S. Cl.
CPC ........ *G06F 17/2288* (2013.01); *G06F 17/241* (2013.01); *G06F 17/248* (2013.01)

(58) Field of Classification Search
CPC ..... G06F 17/241; G06F 17/248; G06F 17/228
See application file for complete search history.

(56) References Cited

U.S. PATENT DOCUMENTS

| | | | |
|---|---|---|---|
| 7,263,521 B2 | 8/2007 | Carpentier et al. | |
| 7,313,575 B2 * | 12/2007 | Carr | ........................ G06Q 10/10 |
| 8,082,144 B1 | 12/2011 | Brown et al. | |
| 8,949,713 B1 | 2/2015 | Sun et al. | |
| 2004/0168153 A1 | 8/2004 | Marvin | |
| 2005/0027871 A1 * | 2/2005 | Bradley | ............. G06Q 20/1235 709/227 |
| 2005/0278270 A1 * | 12/2005 | Carr | ........................ G06Q 10/10 706/25 |
| 2008/0208805 A1 * | 8/2008 | Wang | ................ G06F 17/30386 |

(Continued)

OTHER PUBLICATIONS

U.S. Appl. No. 12/164,761, "Notice of Allowance", dated Oct. 7, 2014, 8 pages.

(Continued)

*Primary Examiner* — Stephen Hong
*Assistant Examiner* — Gregory Vaughn
(74) *Attorney, Agent, or Firm* — Kilpatrick Townsend & Stockton LLP (57) ABSTRACT

Multiple versions of a service can be supported by taking advantage of the fact that version information can be included in any received request. Multiple templates may be stored, with each template being associated with a particular version of the service. There may also be multiple templates associated with each version of a service for various response types. Using the version information, an appropriate template can be determined up front to be used for the response. An instance of the template can be filled in using appropriate data sources, as may be specified using metadata in the template itself. Once the instance of the template is filled, the response can be finalized and sent.

20 Claims, 5 Drawing Sheets

(56) References Cited

U.S. PATENT DOCUMENTS

| | | | |
|---|---|---|---|
| 2008/0222210 A1* | 9/2008 | Hodges | G06Q 40/04 |
| 2008/0243891 A1* | 10/2008 | Super | G06F 17/30914 |
| 2008/0243901 A1* | 10/2008 | Super | G06F 8/35 |
| 2008/0291908 A1* | 11/2008 | Bachmann | G06F 9/5055 370/389 |
| 2008/0307420 A1 | 12/2008 | Benedetti | |
| 2009/0037203 A1* | 2/2009 | Gallagher | G06Q 10/08 705/300 |
| 2009/0222749 A1* | 9/2009 | Marinescu | G06F 8/20 715/764 |
| 2010/0049846 A1* | 2/2010 | Ballette | H04L 67/104 709/224 |
| 2010/0153918 A1 | 6/2010 | Mallick et al. | |

OTHER PUBLICATIONS

U.S. Appl. No. 12/164,761, "Office Action", dated Jun. 20, 2014, 21 pages.

U.S. Appl. No. 12/164,761, "Office Action", dated Dec. 8, 2011, 19 pages.

U.S. Appl. No. 12/164,761, "Office Action", dated Jun. 23, 2011, 20 pages.

* cited by examiner

| Element | Populator |
|---------|-----------|
| A | a |
| B | b |
| C | c |
| D | d |

FIG. 4(a)

| Element | Pre-req. |
|---------|----------|
| A | A |
| B | NIL |
| C | NIL |
| D | A, B |

VERSION-SPECIFIC REQUEST PROCESSING

This patent application is a Continuation of U.S. Non-Provisional patent application Ser. No. 12/164,761, filed Jun. 30, 2008, granted as U.S. Pat. No. 8,949,713, on Feb. 3, 2015, and entitled "VERSION-SPECIFIC REQUEST PROCESSING," the content of which is herein incorporated by reference in its entirety.

BACKGROUND

An increasing amount of applications and functionality is being offered in the form of services over various networks. By providing functionality as a service, a user or customer can simply subscribe to or otherwise access the functionality, while allowing someone else to maintain, host, update, and otherwise provide the functionality as a service. When providing functionality in the form of services, however, the service provider may have little control over which version of the service a user or customer is using. While a service provider can simply stop supporting previous versions of a service, such an approach can be undesirable from a business standpoint. For example, if a user has a data file created by previous version 1 of a service, but that data file is not compatible with current version 10 of a service, then the user might have no way to easily recover that data. Further, users might migrate to other services from other providers that do not require frequent updating, etc. It thus can be desirable in certain situations to ensure that each new version of a service is backwards compatible with at least some of the previous versions.

One way to address these differences is to include logic in the service that can handle data, requests, and other information for multiple versions. For example, each version can include logic for determining how requests need to be handled based upon the version the user is currently operating or expecting. In a basic example, this can include a series of "If . . . then . . . " or similar statements as known in the art for handling different situations. If a service is to report back a series of data values, the service might need to include a series of statements for each data value, such as "If version 1 then report as a string" and "If version 2 then report as an integer", and so on. This can become extremely long and complex as the number of variables and the number of versions increases. In some cases, a new version of a service might be released every six weeks, with previous versions being supported for several years before being retired. In this case, there can be tens or even hundreds of different versions, with differences between all variations having to be handled through logic. For potentially thousands of elements or more, this gets to be way too complex and difficult to maintain. Further, such a solution is not flexible or scalable.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to supporting multiple versions and/or services. Systems and methods in accordance with various embodiments provide a service oriented architecture (SOA)-based pipeline solution utilizing a simple and scalable mapping approach. Since version and service information can be determined from a request, a template can be selected that is appropriate for that version. The template then can be filled in using data from appropriate data sources in parallel, respecting any dependencies, in order to generate a version-appropriate response. While various embodiments are described with respect to Web services, it should be apparent from the teachings and suggestions contained herein that various advantages can be obtained in any service environment.

Figure 1:
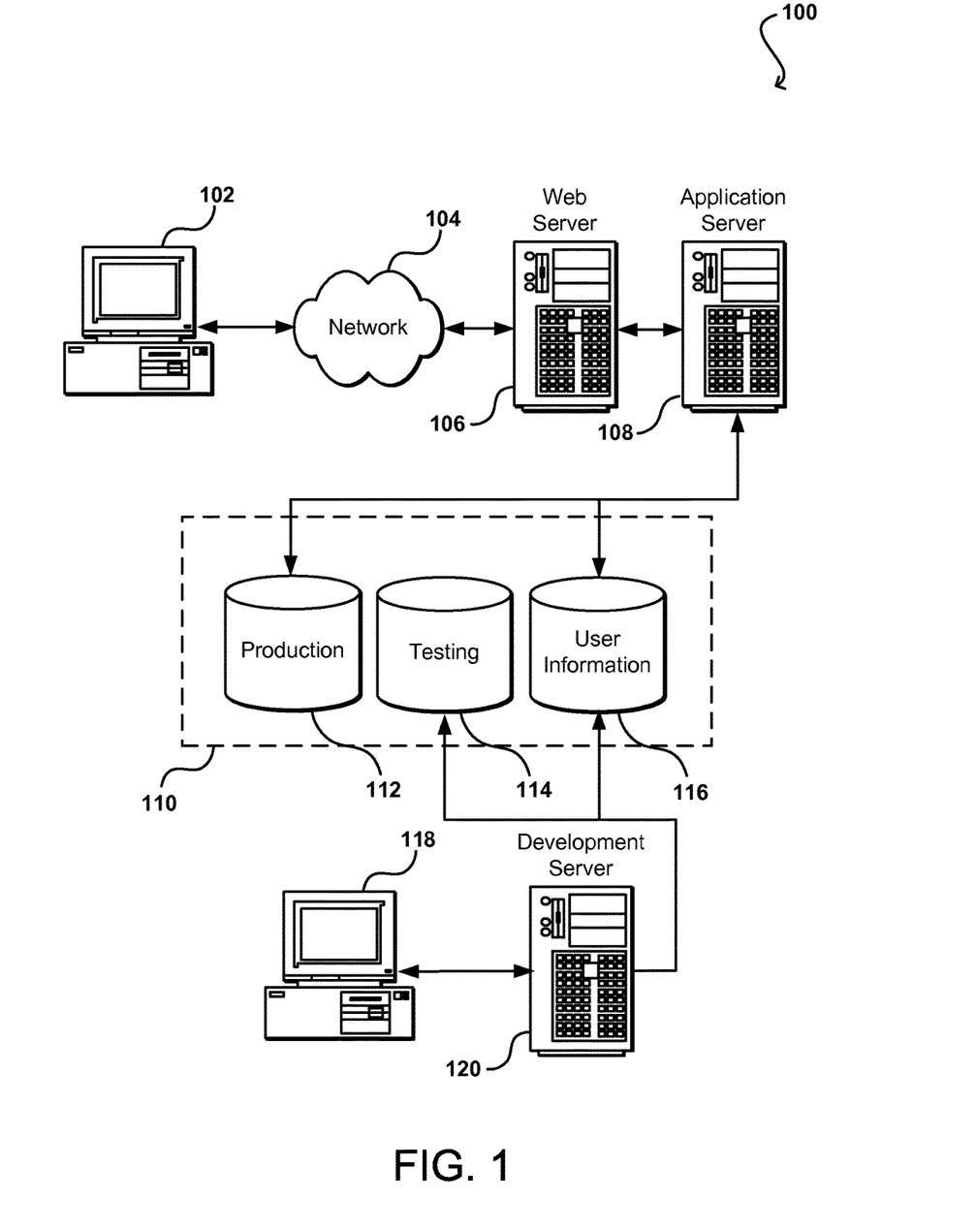
FIG. 1 illustrates an environment in which various embodiments can be implemented.

FIG. 1 illustrates an example of an environment 100 for implementing aspects in accordance with various embodiments. As will be appreciated, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other such elements, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Systems and methods in accordance with one embodiment take advantage of information contained in requests submitted to a service in order to generate a response that is appropriate for that version. As shown in a configuration 200 of FIG. 2, a request 204 from a client 202 can be received by a service 206, such as over a network connection. If the service 206 is a Web service, the request 204 can have a format that is specified by a Web Services Description Language (WSDL), an extensible markup language (XML)-based language for describing Web services. A WSDL file, or a "WSDL" as referred to in the art, defines services as collections of ports, or network endpoints, and provides an XML format for documents utilizing these services. A client program connecting to a Web service can read the WSDL to determine, for example, which functions are available on a particular server. Any special datatypes can be embedded in the WSDL file in the form of an XML Schema. The client can use a protocol such as the Simple Object Access Protocol (SOAP) to call functions listed in the WSDL file. Any requests, such as HTTP requests, from the client device can include WSDL information in parameters of a request that specifies the version of the service which the client device is expecting, utilizing, or with which the client is compatible. As such, the server receiving the request can know the version of the Web service before beginning to subtantively process the request. It should be understood, however, that a WSDL file is only one example of a template or file that can be used to generate a response, and that advantages of the various embodiments can be obtained in other environments than Web-based environments.

Figure 2:
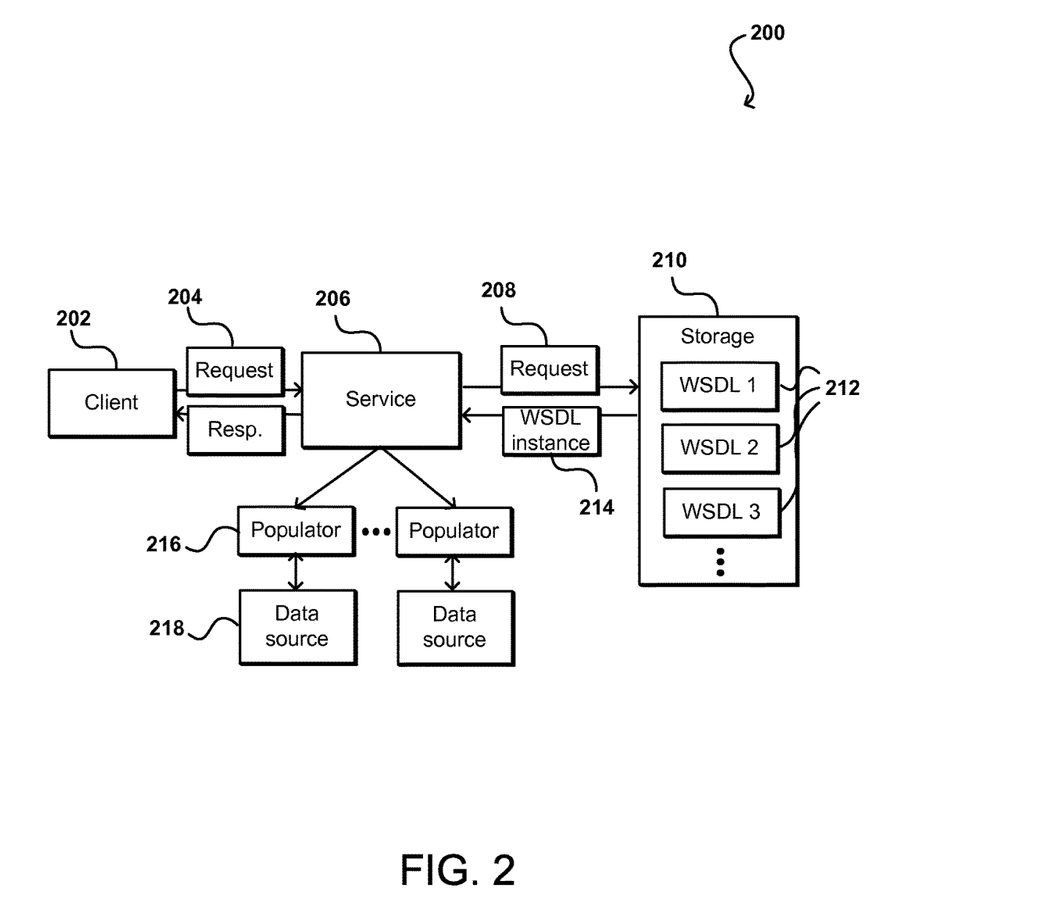
FIG. 2 illustrates a configuration for generating a response to a request in accordance with one embodiment.

Since the version in this embodiment can be determined up front from a service request specifying a WSDL, which is effectively a template for the response, the service 206 can send a version-specific request 208 to a data store 210 containing a plurality of different WSDL files 212, such as a different WSDL file for each version of the service still being supported. The service 206 can receive and/or create a new WSDL instance 214 of the appropriate WSDL file from the data store, which allows the service to generate the type of response that the client is expecting. The type of response can specify information such as types of elements, a structure of the response, expected nodes and elements, etc. Using this information, systems and methods in accordance with various embodiments can build the response by filling in this instance of the WSDL, which is essentially a blank template that is already in the format expected for a particular version of the service. The service 206 simply sends requests to the appropriate data sources, back-end services, etc., in order to obtain the information needed to fill in the template with the appropriate information. In one embodiment, as discussed elsewhere herein, the service contacts at least one populator 216 to obtain the information to fill the template, where each populator knows the appropriate source(s) 218 from which to extract the data. Such an approach is much more efficient than to utilize a web of logic to attempt to determine how to generate a response by analyzing each component that can go into the response. While the term "populator" is used herein to refer to a component for accessing information and "populating" an element with data, for example, various other components, processes, and methods can be used to perform similar tasks in accordance with various embodiments.

In some cases, metadata can be inserted into the WSDL in order to help generate a response that is version-appropriate. In one embodiment, the metadata is inserted using custom attributes. When a WSDL is subsequently published, the custom attributes then can be filtered out, such as by using an XST parser to filter out the data and perform any needed transformation. The information needed to determine and process elements for the response thus can be inserted directly into the WSDL, such that each WSDL is not only a template, but also includes indicating to the system how to process and fill the template to generate a proper response.

Figure 3:
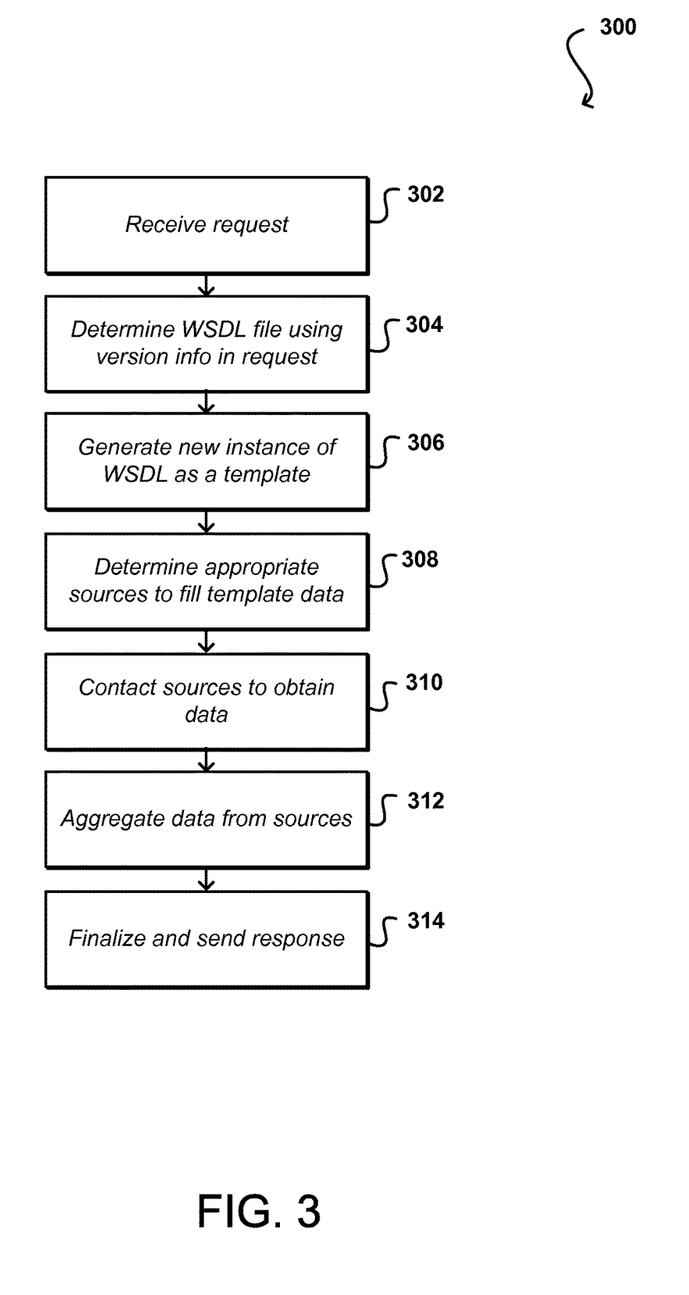
FIG. 3 illustrates steps of a process for generating a response in accordance with one embodiment.

FIG. 3 illustrate steps of a process 300 for generating a version-appropriate response in accordance with one embodiment. In this process, a request is received to a service 302. The service examines information in the request to determine the appropriate WSDL to use in generating a response 304. The service then generates a new instance of the appropriate WSDL to use as a template for generating the response 306. The service analyzes metadata in the instance of the WSDL to determine the appropriate sources to fill data in the template 308. The service then contacts the appropriate source(s) as necessary to fill the template 310. As discussed below, the service can utilize an execution controller or other component to manage calls to populators or other sources for obtaining the necessary data. Data from the various sources is aggregated 312, and once the template is filled using the appropriate data sources, the response is finalized and sent to the source of the request 314 (or another location as specified by the request).

In some cases, a WSDL can be very large as the WSDL may need to address all possible data that a response might need to include for any version of a service. For many responses, however, only a portion of this data will actually be needed. In one embodiment, an application programming interface (API) can be deployed for the service that allows the request to specify a portion of the WSDL to be used in generating the response. The relevant portion(s) of the WSDL can be used to generate the template for the response. If a portion is not specified, the response can still be appropriate for the version but may contain more data than is necessary, and thus may take more time to generate and can require more bandwidth and storage than may otherwise be necessary. Since the WSDL contains metadata registered for the elements, a request response group of sources can be determined from the incoming request that is appropriate for the selected portions of the WSDL template to be used to generate the response.

In order to fill the elements of the template, the service can call a component such as one or more populators 216, as shown in FIG. 2. While a populator can be included in the service itself, a populator also can be a standalone component or service to which other services can call to populate a given template. The populator can include the necessary functionality to fill at least one element of the template, such as by contacting various data sources, performing data aggregation, calling back-end services, etc. In one embodiment, populators communicate by utilizing the template itself as a means to input and output data. If populators instead communicate by passing data through parameters, for example, then it is necessary to have at least some knowledge of the parameter structure of the other populators (s). Such an approach reduces the independence, flexibility, and scalability of the populators and populators-based approach. Since the template already exists, the template can be used as a communication mechanism wherein each populator can fill in the appropriate information in the template, and then pass the template to another populators, for example.

As data sources and services may utilize different protocols, languages, versions, etc., there can be different populators for different elements in a template. The appropriate populator(s) for an element can be specified in the WSDL, such as by specifying the populator in the relevant metadata. In other embodiments, external populator data can be used as well. The service can call and/or activate the appropriate populator(s) as necessary to fill the template. A translator component also can be used that performs any manipulation or processing needed to fill the response. For example, a data source might report a value in minutes that the WSDL expects in seconds. A translator can be called as appropriate, as can be specified in the metadata of the WSDL, to translate the data. A queue can be used to receive data from the populators, such that data is copied into the response one piece at a time in order to prevent problems such as concurrent modification issues. A translator can be any appropriate component, function, process, or other such element able to perform such tasks.

In some embodiments, a service may not be able to simply activate all the populators needed to fill a template. There can be dependencies among the populators, whereby one populator cannot determine the appropriate information to fill an element as that populator relies upon another populator to first populate a different element. While managing the ordering and dependencies could be handled through code, such an approach can be very rigid, would not be scalable, and would be difficult to maintain. It thus can be desirable to determine execution dependencies of the necessary populators for a response without any need to hard code the dependencies.

There are existing approaches to determining and managing dependencies, such as by specifying a business process execution language (BPEL) workflow to direct the ordering of various processing. A BPEL workflow allows for the coding of various component dependencies and interactions. Most of the dependencies in filling a response in accordance with various embodiments, however, can simply be described in terms of data dependencies. In many cases, there is no need for complex logic but only a need to know whether data exists for a particular element upon which a populator relies. If there is data obtained for that element of the template, for example, the depending populator can be activated. There is no need to provide code to determine information about the data, the source, etc., as it is enough to determine that data exists for an element in the template to activate a depending populator. Thus, the relationship between populators can be translated into a simple data dependency. Each populator then only needs to specify the data that is needed, typically including elements in the response.

As discussed above, the service can know, based on metadata in the WSDL, which populator will populate each element. If a populator indicates that it has a dependency on a particular element, the service is able to determine that the element needs to be filled before the service can call the populator. The populator might include the data information in, for example, metadata of the populator. The information also can be contained in the metadata of the WSDL. By utilizing such a self-contained input/output data dependency, an execution graph can be built dynamically to determine the execution dependencies without having to code these dependencies inside the components.

Figure 4A:
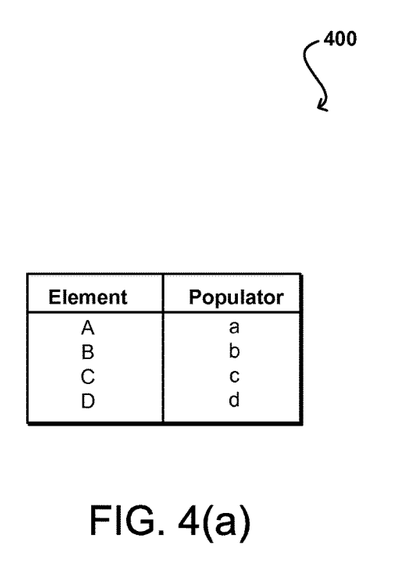
FIGS. 4(a) and 4(b) illustrate information used to build an execution graph in accordance with one embodiment.
Figure 4B:
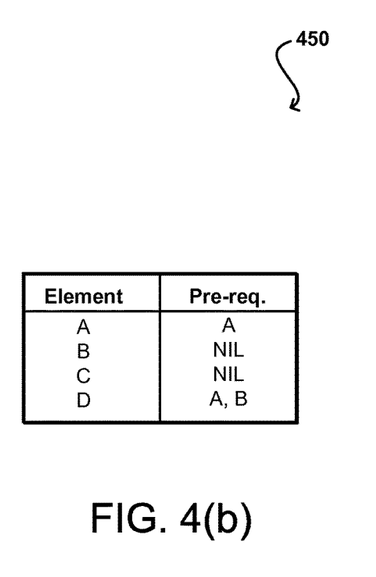

FIGS. 4(a) and 4(b) illustrate populator information 400 and populator pre-requisites 450 that can be specified as configuration data in accordance with one embodiment. As can be seen in FIG. 4(a), the metadata can specify a populator for each element of the template to be used in generating the response. As can be seen in FIG. 4(b), the populator metadata also can contain information specifying which elements are pre-requisites to be filled in before the populator can be called. This information can be used to build a data dependency graph, or an adjacent graph, to essentially generate a two-dimensional metric for the relationship between populators and elements. As can be seen, populators a and b have no dependencies, and thus these populators can be called initially (and concurrently) in order to fill elements of the template. Since populator d has a dependency on element A, and element A is populated by populator a, populator d must wait for populator a to fill element A before being called. Since populator c also has a dependency on element A, as well as a dependency on element B, populator c must still wait for populator b to fill element B before populator c can be called. None of the populators care how the other data is populated, only that the population occurs.

The data dependency information of FIG. 4(b) in some embodiments can be used to create an execution tree that can be used with the WSDL instance template to allow the service to first call each populator without a dependency needed to populate the appropriate element(s). As the elements are filled, the service can move down the branches of the tree to activate subsequent populators relying on those elements being filled. Any populators without outstanding dependencies can be fired at substantially the same time, and populators can be fired as soon as any outstanding dependencies are filled. Such an approach is akin to processor pipelining, or pipelining in a service oriented architecture (SOA), where parallelism among tasks can be determined. In this approach, however, it does not matter if a populator can be called by 300 components and has at least that many dependencies, as the populator only depends on the presence of certain data, thus the code does not have to be adjusted for each additional component, changes in component, etc. Such an approach is highly scalable and allows for parallelism up to an available capacity of the system.

Further, some previous approaches utilize WSDL object model mapping, wherein an incoming request is mapped to an internal object model in Java, Perl, etc., then objects in the model process the response by calling other objects. The state/data is actually kept in the objects, and a serialization component is subsequently used to extract the data from the objects and serialize the data to create the response, which then is returned in response to the request. This is referred to herein as a "contract last" approach, wherein when processing is completed the data is extracted from the objects and copied to the contract (the WSDL). In such an approach, there is an intermediate stage when the internal object model holds the data to be processed and returned to the customer. While such an approach might be acceptable for one object model and one version, if there are dozens of different object models and dozens of different WSDLs, such an approach can be undesirably complex. Some existing approaches have attempted to map the different versions into a single object model, but this goes back to the need for coding all the different variations which comes with deficiencies including those discussed above. If the new versions are always additive, or always backwards compatible, then this might not be a problem. But aspects can change from version to version, and each version in theory could be completely different. Accordingly, a simple and scalable approach can be desirable.

In approaches described herein, when there is a change to a WSDL, or a new version of a WSDL, a new populator can simply be specified and identified through the metadata. In this case, responses for previous versions can simply process as they always have, and the new populator would only be called for the new version. Such an approach allows the systems and versions to remain intact, while allowing for any amount of scalability, flexibility, and extensibility for new versions with minimal effort with regard to coding. Such an approach is referred to herein as a "contract first" approach, as the WSDL is determined first, and then the "blanks" are filled in accordingly by the appropriate populators. Since every response is version-aware, there is no need to manage the versions as the process is driven by the versions themselves. The version is determined in the beginning, which determines the WSDL template to use, and then everything else follows based on the configuration of the WSDL.

In some embodiments, the metadata from a WSDL can be pre-processed and then loaded when a process starts up. Since performance can be a problem when using metadata for business intelligence, pre-processing of the metadata allows for the generation of, for example, an intermediate hash map. When the process subsequently starts up, the metadata can be immediately stored and applied using the hash map without any significant overhead due to the metadata.

In one embodiment, an incoming request first goes through a series of services, such as validations, authentications, etc. A view of the request can be generated, such as an XML document map implementation of the request. The view then can be "wrapped" around the request which allows for quick access to the data contained therein. If the information was extracted using previous approaches, such as using XPath to extract data by traversing a DOM tree for an XML request, the extraction process could take an undesirably long amount of time. Using the view with the hash table allows for fast data extraction.

Figure 5:
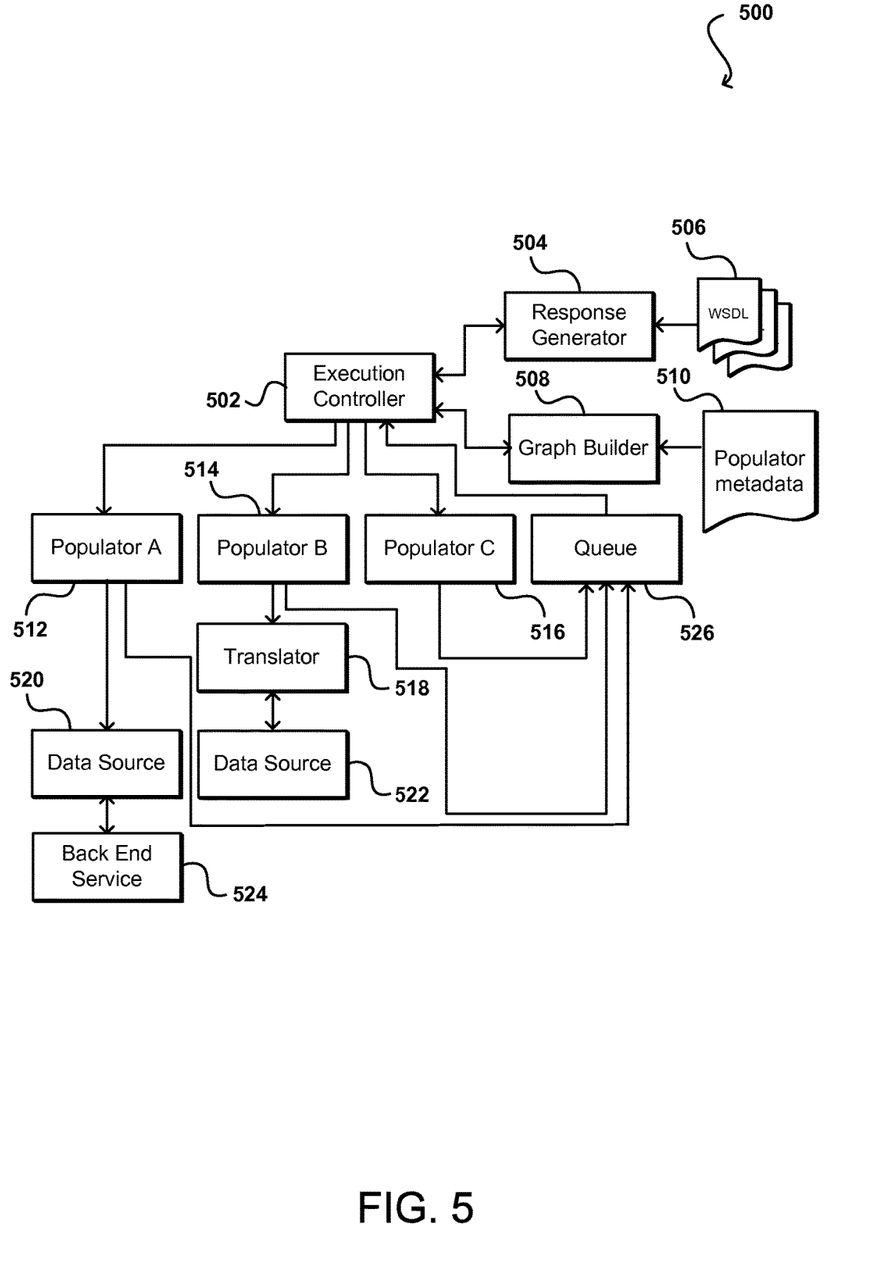
FIG. 5 illustrates a configuration for generating a response to a request in accordance with one embodiment.

FIG. 5 illustrates components 500 that then can be used to generate a response for such a request in accordance with one embodiment. In this example, the flow for processing the request is controlled by an execution controller 502, which can execute an business logic invocation (BLI) approach to invoking the proper services, aggregating the results, and otherwise generating the response. In this example, when the execution controller 502 pulls the WSDL or version information from the request, the execution controller contacts a response generator 504, which extracts the proper response template from the set of WSDL files 506. The execution controller also contacts a graph builder 508 which uses metadata in the WSDL and populator metadata 510 to build a dependency graph that is provided to the execution controller. Using the dependency graph, the execution controller contacts each appropriate populator, such as populators A 512 and C 516, which do not have any data dependencies. The execution controller 502 will contact any remaining populators, such as populator B 514, after the data dependency is filled. As shown, a populator 516 might be able to determine the data directly, placing the data into a queue 526. In other cases, a populator might have to contact a data source 520, 522, and may also have to work with at least one back end service 524 to obtain the data and place the data in the queue 526. If necessary, a translator 518 might be needed to format the data in a format the response is expecting, before placing the data in the queue 526. Data in the queue can be pulled one piece at a time and aggregated by the execution controller 502 to fill the response template. Once the response template is filled, the execution controller 502 can cause the response to be sent to the source of the initial request. Various other components and combinations can be used to obtain similar results within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing support for multiple versions of a web service, comprising:
    maintaining, by a computing system of a web service provider, a plurality of description language templates, individual description language templates of the plurality of description language templates being associated with a different version of a web service and containing metadata indicating at least one data source;
    receiving a request to access at least one function of the web service, the request including version-specific information;

identifying an appropriate description language template from the plurality of description language templates based at least in part on the version-specific information, the appropriate description language template including a plurality of elements to be populated;

generating, for the appropriate description language template, a data dependency graph indicating dependencies between the plurality of elements to be populated, the data dependency graph indicating at least one prerequisite element which must be populated before at least one dependent element is to be populated;

generating, by the computing system, a version-appropriate response to the received request by populating the identified appropriate description language template with data from the at least one data source in accordance with the generated data dependency graph, wherein the version-appropriate response includes at least a version-specific data file that can be consumed by a version of the web service indicated in the version-specific information; and providing the generated version-appropriate response to a source of the received request.

2. The method according to claim 1, further comprising granting, to the source of the received request, access to the at least one function of the web service.

3. The method according to claim 1, further comprising determining, from the request, a portion of the description language template to be used in generating the version-appropriate response.

4. The method according to claim 1, further comprising utilizing a translator component to translate the data into a format specified by the description language template.

5. The method according to claim 1, wherein each version of the web service is associated with at least one description language template from the plurality of description language templates.

6. The method according to claim 1, wherein the version-appropriate response to the received request is generated by calling a first populator component to populate the at least one prerequisite element and subsequently calling a second populator component to populate the at least one dependent element, the first populator component being distinct from the second populator component.

7. The method according to claim 6, wherein the first populator component is called based upon first metadata associated with the at least one prerequisite element and the second populator component is called based upon second metadata associated with the at least one dependent element.

8. A system for providing support for multiple versions of a service, comprising:

a processor; and a memory device including instructions that, when executed by the processor, cause the processor to:

receive a request including information identifying an operation to be taken with regard to the service;

determine, from the received request, a version of the service;

identify, based at least in part on the determined version of the service, a version-specific template from a plurality of version-specific templates, wherein individual version-specific templates from the plurality of version-specific templates are stored by the system with respect to a different version of the service, the version-specific template including a plurality of elements to be populated;

determine dependencies between the plurality of elements to be populated, the dependencies indicating at least one prerequisite element to be populated before at least one dependent element to be populated; and generate a version-appropriate response to the received request by populating the identified version-specific template with data from at least one data source associated with the service in accordance with the determined dependencies.

9. The system of claim 8, wherein at least one version-specific template from the plurality of version-specific templates includes metadata identifying a source of the data.

10. The system of claim 9, wherein generating the version-appropriate response to the received request comprises populating the version-specific template with at least the data obtained from the source.

11. The system of claim 8, wherein the received request includes an indication of a portion of the version-specific template, and wherein the version-appropriate response is generated by populating the indicated portion of the version-specific template.

12. The system of claim 8, wherein the instructions, when executed by the one or more processors, further cause the computer system to provide the generated version-appropriate response to a location specified in the received request.

13. The system of claim 8, wherein the instructions, when executed by the one or more processors, further cause the computer system to determine, from the received request, a type of response to be generated.

14. The system of claim 13, wherein the instructions, when executed by the one or more processors, further cause the computer system to determine, based at least in part on the type of response, at least one of a structure, an expected element, and an expected node of the response.

15. The system of claim 8, wherein the version of the service is extracted from a parameter of the request, the parameter having been specified by a sender of the request.

16. One or more non-transitory computer-readable storage media having collectively stored thereon instructions for providing support for multiple versions of a web service that, when executed by one or more processors of a computer system, cause the computer system to perform operations comprising:

maintaining a plurality of web service templates, individual web service templates of the plurality of web service templates being associated with a different version of a web service;

receiving an indication that an operation is to be performed with regard to the web service;

determining, based at least in part on the received indication, a response type and a respective version of the web service;

identifying, based at least in part on the determined response type and the respective version of the web service, a version-specific web service template from the plurality of web service templates, the version-specific web service template including a plurality of elements to be populated;

determining at least one prerequisite element of the plurality of elements to be populated before at least one dependent element of the plurality of elements to be populated;

creating a new instance of the identified version-specific web service template; and populating the new instance in accordance with at least one piece of metadata associated with the version-specific web service template in accordance with the at least one prerequisite element and the at least one dependent element.

17. The one or more non-transitory computer-readable storage media of claim 16, wherein the operation with regard to the web service includes instructions for configuring a connection between the web service and a client device.

18. The one or more non-transitory computer-readable storage media of claim 17, wherein the respective version is determined based at least in part on a compatibility with the client device.

19. The one or more non-transitory computer-readable storage media of claim 16, wherein the new instance is populated with data extracted from a plurality of data sources, the plurality of data sources being specified in the metadata associated with the version-specific web service template.

20. The one or more non-transitory computer-readable storage media of claim 16, wherein the metadata associated with the version-specific web service template is processed before receiving the indication, the new instance being populated in accordance with a hash map created from the processed metadata.

\* \* \* \* \*